Figure 1:
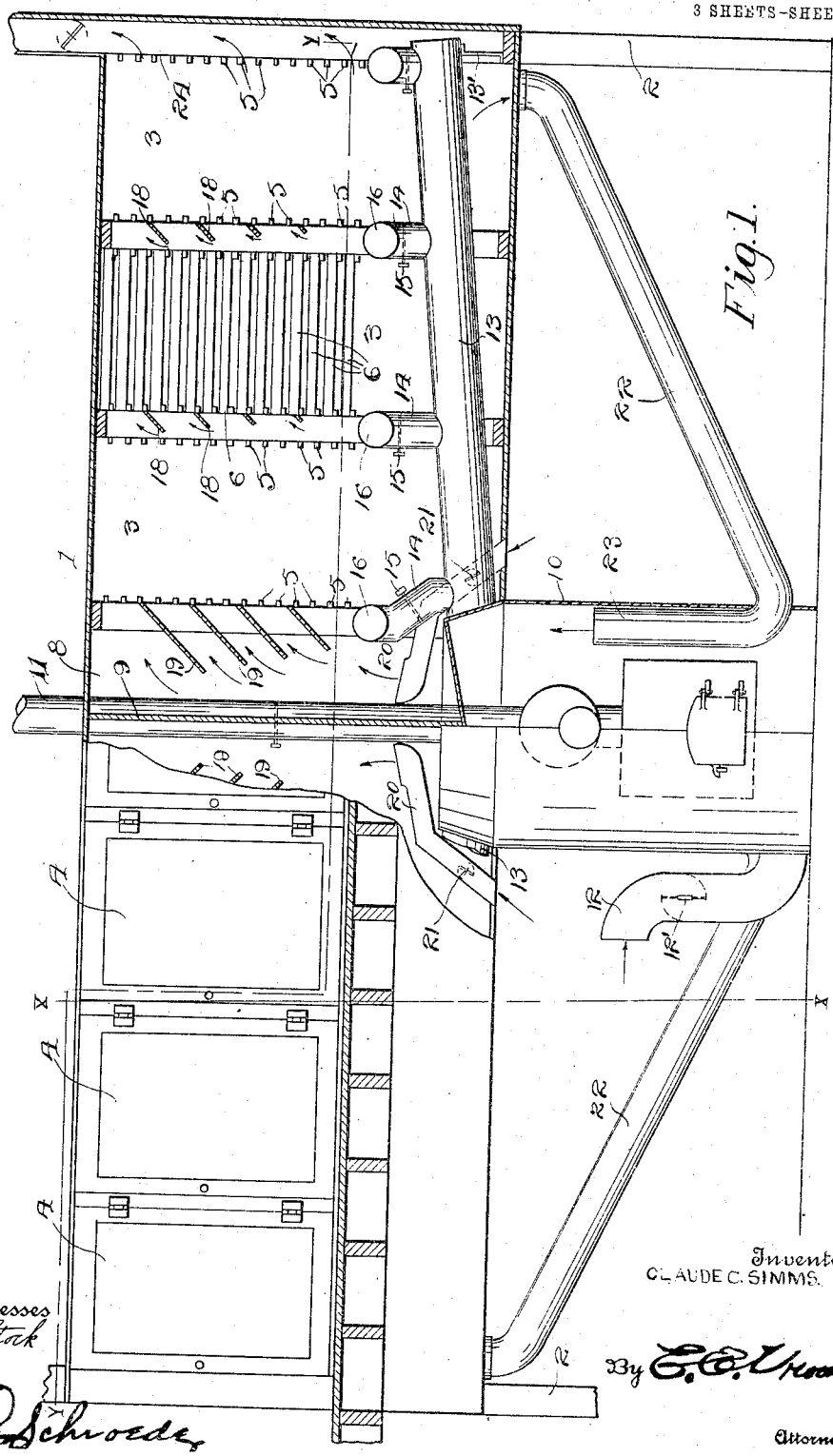

C. C. SIMMS.
FRUIT DRIER.
APPLICATION FILED APR. 10, 1911.

1,025,212.

Patented May 7, 1912.

3 SHEETS—SHEET 1.

Witnesses
H. A. Stock
H. C. Schroeder

Inventor
CLAUDE C. SIMMS.

By C. C. Thomas
Attorney

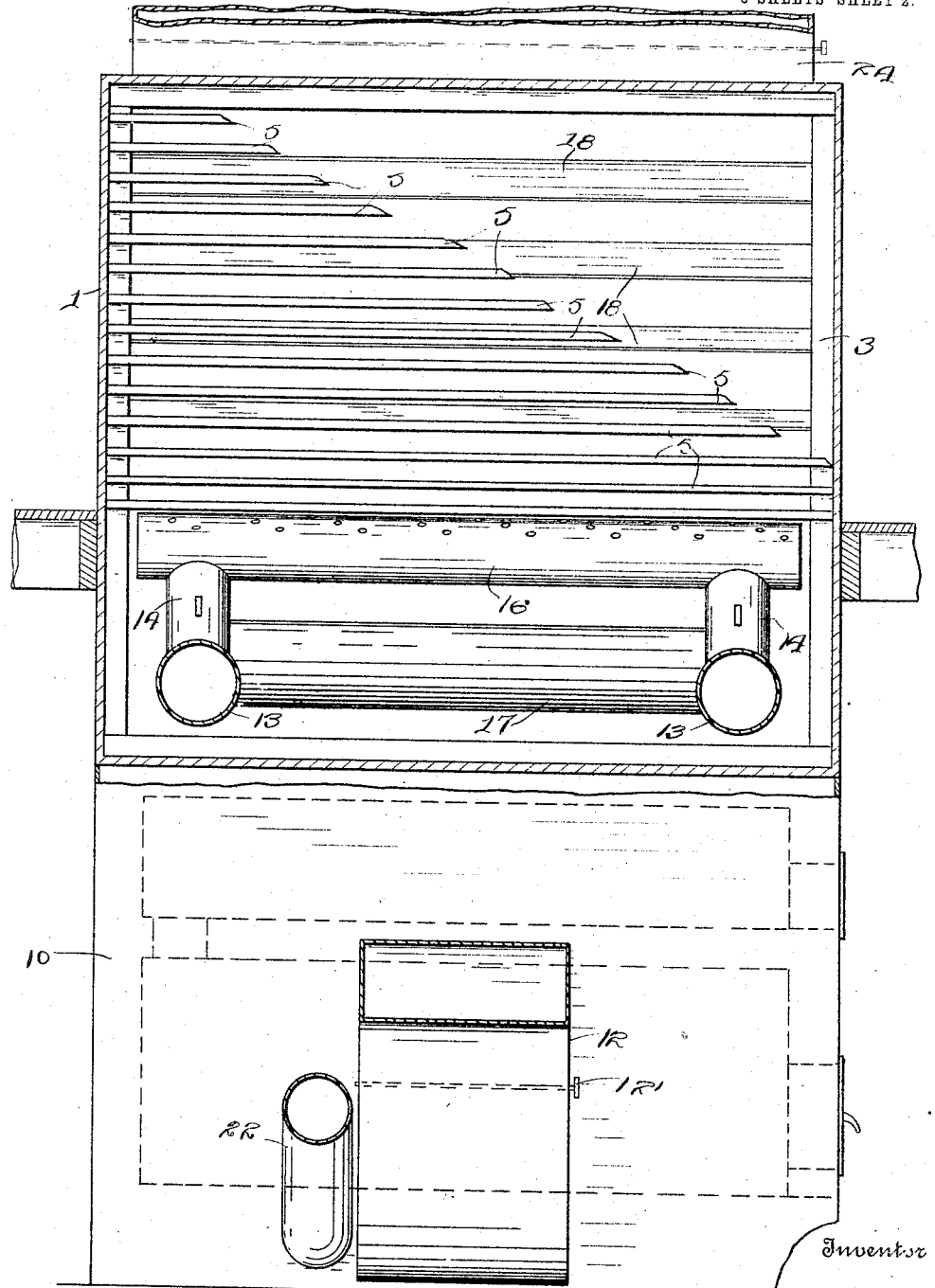

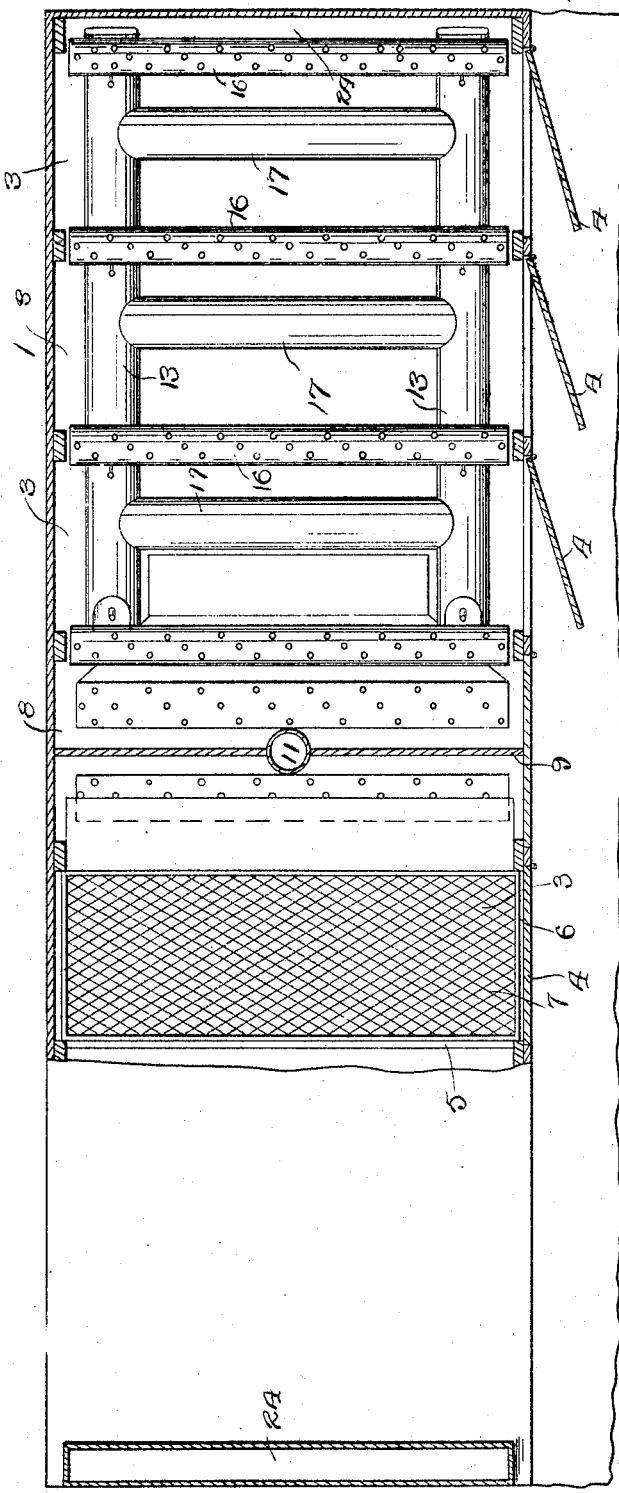

UNITED STATES PATENT OFFICE.

CLAUDE C. SIMMS, OF BERKELEY, CALIFORNIA, ASSIGNOR TO CALIFORNIA LIKFRESH COMPANY, A CORPORATION OF CALIFORNIA.

FRUIT-DRIER.

1,025,212.  Specification of Letters Patent.  Patented May 7, 1912.

Application filed April 10, 1911. Serial No. 620,032.

*To all whom it may concern:*

Be it known that I, CLAUDE C. SIMMS, a citizen of the United States, residing at Berkeley, in the county of Alameda and State of California, have invented certain new and useful Improvements in Fruit-Driers, of which the following is a specification.

This invention relates to drying apparatus and has special reference to drying apparatus for drying fruits, berries, vegetables, etc., by passing heated air over the same when arranged on screens.

The invention has for its object to provide an improved apparatus of this kind constructed and arranged as hereinafter set forth and claimed.

Referring to the accompanying drawings:—Figure 1 is a view in elevation and partly in longitudinal section, and partly broken away, of a drying apparatus constructed in accordance with this invention. Fig. 2 is a view in elevation and vertical cross section on the line X—X, Fig. 1. Fig. 3 is a plan view in horizontal section on the line Y—Y, Fig. 1.

In the construction of this invention an oblong drying chamber 1 is provided which is mounted on uprights 2 and is separated into a number of drying chambers 3, each of said chambers 3 being provided with hinged doors 4 whereby access may be had to the same. The chambers 3 are each provided with a row of narrow strips 5 on each side thereof on which are supported a vertical column of trays slidably mounted thereon and adapted to be withdrawn therefrom, each of said trays being formed, as more particularly shown in Fig. 3 of a rectangular frame 6 having a reticulated bottom 7, preferably formed of wire netting. A central drying chamber 8 is provided separated by a partition 9 and located beneath said chamber and projecting up into the bottom of the entire drying structure is a furnace 10 having a smoke flue 11 extending up through the chamber 8 and out of the top of the apparatus. The furnace is also provided with a cold air inlet pipe 12 having a damper 12'. Leading from the hot air chamber of the furnace 10 are two pipes 13 extending to the end of the drying room on each side of the central chamber 8 and being slightly at an incline in the lower part of the apparatus, as shown in Fig. 1, the outer ends being supported by a bracket 13'. Each of the pipes 13 has projecting at intervals from its top, short vertical pipes 14 which are each provided with a damper 15, and connected with the ends of transverse perforated pipes 16 located in the lower part of the drying chamber adjacent thereto. The pipes 13 are connected by transverse pipes 17 which serve to keep the air at an equal pressure in all of the flues. Between each of the drying chambers 3 is a partition formed of a number of deflectors 18, spaced apart from one another and being of different lengths so that the ascending currents of heated air are divided equally between the lower and upper portions of the drying chambers. The central chamber 8 is also provided on each side thereof with deflectors 19 spaced apart from each other and serving to divide the air entering into and ascending in the chamber 8 from the pipes 20 which open into the outside air, as shown, and permit the outside air to enter a chamber. Each of the pipes 20 is provided with a damper 21 so as to entirely shut off the outside air when necessary. An inclined pipe 22 is connected at each end of the entire drying chamber and inclined downward therefrom to the furnace and is provided at its inner end with a vertical portion 23. By means of this pipe air is drawn from the bottom of the drying chambers at the farthest end thereof and returned to the furnace.

The apparatus operates as follows:— Fruit or other things having been placed on the trays, heated air ascends from the furnace through the pipes 13 and up to and out of the transverse perforated pipes 16, the main portion of the heat passing up between the drying chambers and over the various trays and finally passing out of the vertical escape flue 24, and by drawing the air from the bottom of the drying chamber at each end, the top of the chamber is prevented from becoming hotter than the bottom, and the air is carried back to the furnace to be reheated and again circulated.

It will be seen that by means of this improved apparatus an even diffusion of heated air will be had throughout the apparatus with a consequent uniform temperature in all parts.

What I claim is:—

1. In a drying apparatus of the kind described, a series of drying chambers each having a column of reticulated trays, heat deflectors located above one another between said columns of trays, heat distributing pipes located in the lower part of said drying chambers, a hot air furnace connected with said heat distributing pipes, and pipes for conducting the air from said drying chambers to the furnace and redistributing the same.

2. In a drying apparatus of the kind described, a drying chamber sub-divided into a number of drying chambers, each having a vertical column of reticulated trays separated from each other, deflectors located in a vertical column between each column of trays, pipes extending through the lower part of said drying chambers, transverse perforated pipes connected with said first named pipes, and located adjacent to said columns of trays, a furnace connected with said pipes in the bottom of the drying chambers, and a cold air inlet pipe connected with said furnace.

3. In a drying apparatus of the kind described, a series of drying chambers, each having a vertical column of reticulated trays spaced apart from each other, a vertical column of hot air deflectors located between each of said drying chambers, inclined hot air pipes located in the lower part of said drying chambers, and having a number of vertical pipes, transverse perforated pipes connected with said vertical pipes and located adjacent to said columns of trays, and a hot air furnace connected with the pipes in the bottom of said drying chambers.

4. In a drying apparatus of the kind described, a furnace, an oblong drying chamber located above said furnace and having a central hot air chamber provided with a central partition located above said furnace, and provided with a vertical row of heat deflectors on each side thereof, a number of drying chambers located on each side of said central drying chamber, each of said drying chambers having a column of slidable reticulated trays spaced apart from each other, a vertical row of heat deflectors of different lengths located between each of said columns of trays, inclined heat distributing pipes connected with the furnace and extending through the bottom of said drying chambers, each of said pipes having vertical pipes, and transverse perforated pipes connected with said vertical pipes, an air escape flue connected with each end of the apparatus, an air pipe connected with the bottom of the drying chamber at each end of the apparatus and extending downward to the furnace and having a vertical arm located in said furnace, and a cold air inlet pipe connected with the lower end of said central drying chamber.

5. In a drying apparatus of the kind described, a furnace, a number of drying chambers located above said furnace on each side thereof, each of said drying chambers having a column of reticulated trays spaced apart from each other, a series of heat deflectors located between said columns of trays, a series of hot air pipes connected with said furnace for distributing hot air through and over said trays, pipes for admitting and mingling cold air with the hot air from said furnace, and means for drawing air from said drying chambers back to the furnace and redistributing the same in heated condition to the drying chambers.

In testimony whereof I affix my signature in presence of two witnesses.

CLAUDE C. SIMMS.

Witnesses:
    H. C. SCHROEDER,
    J. H. WESTER.